(12) United States Patent
Westenberger et al.

(10) Patent No.: US 8,623,566 B2
(45) Date of Patent: Jan. 7, 2014

(54) AIRCRAFT FUEL CELL SYSTEM

(75) Inventors: Andreas Westenberger, Buxtehude (DE); Martin Arendt, Braunschweig (DE); Lars Frahm, Hamburg (DE); Till Marquardt, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 579 days.

(21) Appl. No.: 12/865,007

(22) PCT Filed: Jan. 28, 2009

(86) PCT No.: PCT/EP2009/000537
§ 371 (c)(1),
(2), (4) Date: Nov. 5, 2010

(87) PCT Pub. No.: WO2009/095218
PCT Pub. Date: Aug. 6, 2009

(65) Prior Publication Data
US 2011/0045370 A1  Feb. 24, 2011

(30) Foreign Application Priority Data
Jan. 30, 2008 (DE) .......................... 10 2008 006 742

(51) Int. Cl.
*H01M 8/04* (2006.01)
*B64D 41/00* (2006.01)
(52) U.S. Cl.
USPC .............. 429/434; 429/435; 429/436; 244/58

(58) Field of Classification Search
USPC ......... 429/433, 434, 435, 436, 437, 438, 439; 244/58
See application file for complete search history.

(56) References Cited

U.S. PATENT DOCUMENTS 6,296,957 B1 * 10/2001 Graage .......................... 429/425
6,834,831 B2    12/2004 Daggett (Continued)

FOREIGN PATENT DOCUMENTS

DE  19821952  11/1999
DE  10356012   6/2005

(Continued)

OTHER PUBLICATIONS

European Patent Office, International Search Report, mailed on May 7, 2009.

*Primary Examiner* — Carlos Barcena
(74) *Attorney, Agent, or Firm* — Wood, Herron & Evans, LLP

(57) ABSTRACT

An aircraft fuel cell system includes a fuel cell which has an oxidant inlet for supplying an oxygen-containing medium to the fuel cell. An oxidant supply line has a first end which is connected to the oxidant inlet of the fuel cell. A second end of the oxidant supply line is connectable to a used air outlet of a cabin of the aircraft. A heat exchanger is located in the oxidant supply line and thermally couples the oxygen-containing medium flowing through the oxidant supply line and a second medium flowing through an air conditioning process air line of an air conditioning unit, the heat exchanger being located downstream of a cabin air compressor in the air conditioning process air line.

12 Claims, 2 Drawing Sheets

(56) References Cited

U.S. PATENT DOCUMENTS

Figure 1:
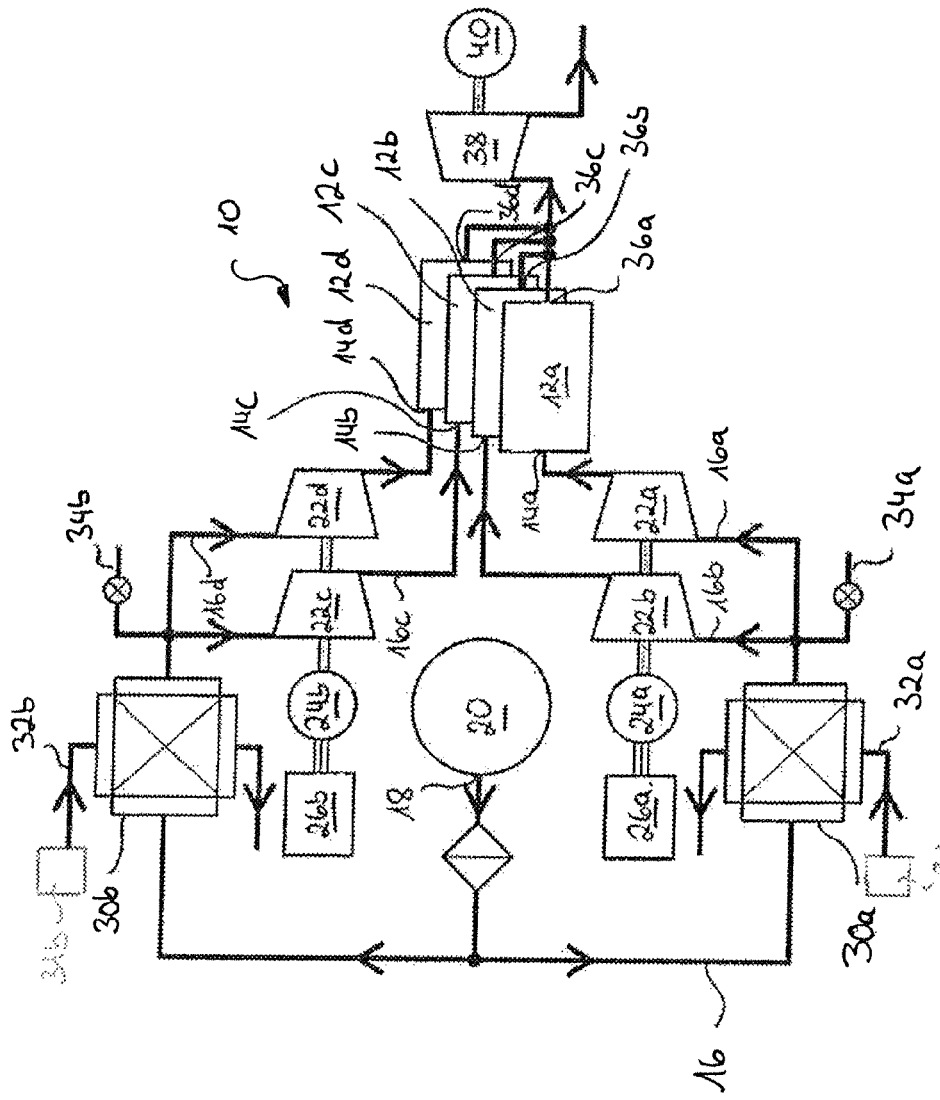

| | | | |
|---|---|---|---|
| 2004/0219408 A1* | 11/2004 | Hesse | 429/26 |
| 2006/0029849 A1* | 2/2006 | Metzler | 429/26 |
| 2006/0237583 A1 | 10/2006 | Fucke et al. | |
| 2007/0111060 A1 | 5/2007 | Hoffjann et al. | |
| 2007/0172707 A1 | 7/2007 | Hoffjann et al. | |
| 2009/0309364 A1* | 12/2009 | Marconi | 290/52 |

FOREIGN PATENT DOCUMENTS

| | | |
|---|---|---|
| DE | 102004034870 | 2/2006 |
| DE | 102005054882 | 3/2007 |
| DE | 102005054885 | 5/2007 |
| DE | 102006035621 | 2/2008 |
| EP | 1619738 | 1/2006 |
| WO | 2008001006 | 1/2008 |

* cited by examiner

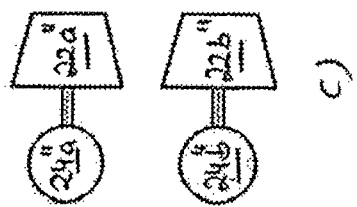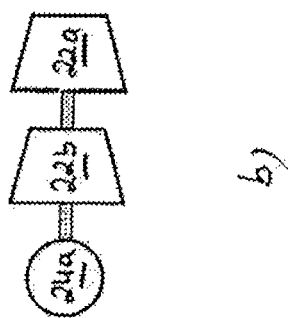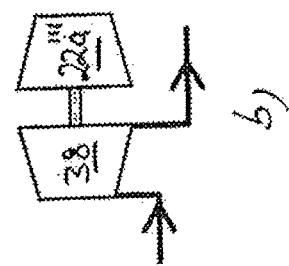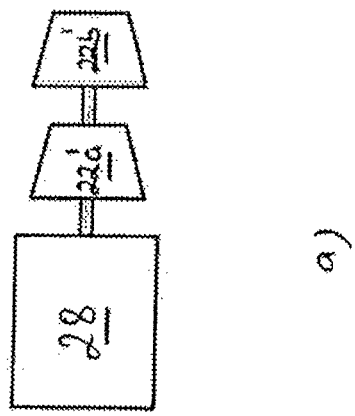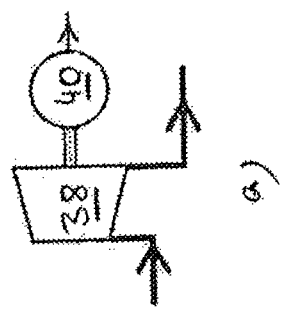
Fig. 2
Fig. 3

AIRCRAFT FUEL CELL SYSTEM

This application claims priority to International Application No. PCT/EP2009/000537, filed Jan. 28, 2009 under Section 371 and/or as a continuation under Section 120; which in turn claims priority to both U.S. Ser. No. 61/024,579, filed Jan. 30, 2008, and German Application No. 10 2008 006 742.3, filed Jan. 30, 2008.

TECHNICAL FIELD

The present invention relates to a fuel cell system which is provided for use on board an aircraft, in particular an aeroplane. The invention further relates to a method of operating an aircraft fuel cell system of this kind.

BACKGROUND

Fuel cell systems enable electrical power to be generated with low emissions and a high level of efficiency. For this reason, at present efforts are also being made in aeroplane construction to use fuel cell systems to generate the electrical energy required on board an aeroplane. For example, it is conceivable to partially replace the generators that are currently utilized to supply on-board power, which are driven by the main engines or the auxiliary turbine, by a fuel cell system. Moreover, a fuel cell system could also be utilized for the emergency supply of power to the aeroplane and replace the ram air turbine (RAT) which has been utilized hitherto as an emergency power unit.

Fuel cells conventionally include a cathode region and an anode region, separated from the cathode region by an electrolyte. When the fuel cell is operated, a fuel, for example hydrogen, is supplied to the anode side of the fuel cell and an oxygen-containing oxidant, for example air, is supply to the cathode side of the fuel cell. In the case of a polymer electrolyte membrane fuel cell, the hydrogen molecules react, at an anode catalyst in the anode region, for example in accordance with the equation

and in so doing form positively charged hydrogen ions and give off electrons to the electrode.

The H$^+$ ions which are formed in the anode region then diffuse through the electrolyte to the cathode, where they react, at a cathode catalyst in the cathode region, with the oxygen supplied to the cathode and the electrons that are fed to the cathode by way of an external circuit, in accordance with the equation

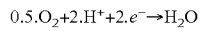

to form water.

To minimise pressure losses inside the fuel cell system, to ensure that the distribution of gas to the electrodes of the fuel cell is uniform and to keep the volume of flow through the fuel cell as small as possible, it is advantageous to supply the cathode of a fuel cell with compressed air, that is air which is at a pressure above atmospheric pressure.

An object of the invention is to provide an aircraft fuel cell system which makes it possible to supply a fuel cell with compressed air in an energy-efficient manner. Further, an object of the invention is to provide a method of operating an aircraft fuel cell system of this kind.

SUMMARY OF THE INVENTION

To solve this problem an aircraft fuel cell system according to the invention includes a fuel cell which has an oxidant inlet for supplying an oxygen-containing medium to the fuel cell. Preferably, the fuel cell is supplied with air as the oxidant. If the fuel cell is for example a polymer electrolyte membrane fuel cell, the oxidant inlet is connected to a cathode region of the fuel cell. An anode region of the fuel cell preferably has a fuel inlet through which the anode region of the fuel cell can be supplied with a fuel, preferably hydrogen. The aircraft fuel cell system according to the invention further preferably includes an oxidant supply line. A first end of the oxidant supply line is connected to the oxidant inlet of the fuel cell. A second end of the oxidant supply line is connectable to a used air outlet of a cabin of the aircraft. This makes it possible to feed used air from the cabin of the aircraft to the oxidant inlet of the fuel cell by way of the oxidant supply line. In the fuel cell, the oxygen in the used air from the cabin is for example converted by the cathode reaction described above.

The present invention makes use of the fact that the cabin of an aircraft, for example an aeroplane, is kept at a pressure that is higher than atmospheric pressure with the aid of an air conditioning unit, when the aircraft is in flight. For example, the cabin pressure in a passenger aeroplane is approximately 0.8 bar even when the aeroplane is at cruising altitude and the atmospheric pressure is only approximately 0.25 bar. Conventionally, some of the used air from the cabin is returned to a mixing chamber of the air conditioning unit as recirculation air, but some is also fed overboard without being utilised. The present invention now makes it possible to utilise some of the used air from the cabin, which is preferably removed from the used air flow which in previous systems is fed overboard without being utilised, to operate the fuel cell provided on board the aircraft. Because the used air from the cabin is already at a markedly higher pressure level than the ambient air when the aircraft is in flight, when used air from the cabin is utilised as the oxidant in a fuel cell the increase in pressure to the air to be supplied to the fuel cell, necessary to ensure proper functioning of the fuel cell, can be markedly smaller than when ambient air is utilised. The present invention thus makes it possible to minimise the energy expenditure for compression of an oxidant flow to be supplied to a fuel cell during operation. A further advantage of the aircraft fuel cell system according to the invention is that no additional ram air intakes have to be provided on the aircraft to supply air to the fuel cell system. This means that a disadvantageous increase in the air drag of the aircraft is avoided.

In a preferred embodiment of the aircraft fuel cell system according to the invention, a compressor is arranged in the oxidant supply line. The compressor serves to compress used air from the cabin that is to be supplied to the fuel cell to a pressure level that ensures proper functioning of the fuel cell system both when an aircraft fitted with the aircraft fuel cell system according to the invention is operated on the ground and when it is operated in flight. Preferably, the compressor is adapted to compress the used air flow from the cabin which is to be supplied to the fuel cell to a pressure level of approximately 1.3 to 1.4 bar. Moreover, the temperature of the used air flow from the cabin which is to be supplied to the fuel cell is increased by the compression. Preferably, after compression the air flow to be supplied to the fuel cell is at a temperature corresponding approximately to the operating temperature of the fuel cell.

When the aircraft fuel cell system according to the invention utilises a fuel cell such as a low-temperature polymer electrolyte membrane fuel cell, which operates at a relatively low level of operating temperature, the used air from the cabin which is to be supplied to the fuel cell is in some cases already at the desired temperature once it has been compressed by the compressor arranged in the oxidant supply line. However, an aircraft fuel cell system which is fitted with a fuel cell operating at a relatively high level of operating temperature, such as a high-temperature polymer electrolyte membrane fuel cell, preferably further includes a heat exchanger arranged in the oxidant supply line. The heat exchanger serves to transmit heat from a heat transfer medium to the used air from the cabin which is to be supplied to the fuel cell. An energy-efficient heat transfer to the used air from the cabin which is to be supplied to the fuel cell is possible because of the relatively great temperature difference if the heat exchanger is arranged upstream of the compressor in the oxidant supply line. In particular, as a result of the relatively great temperature difference, with this arrangement the heat transfer surface and hence the size and weight of the transfer device may be kept relatively small.

In a particularly preferred embodiment of the aircraft fuel cell system according to the invention, the heat exchanger is adapted to thermally couple the medium flowing through the oxidant supply line and a medium flowing through a line of an aircraft air conditioning unit. For example, flowing through the heat exchanger there may be air conditioning process air to be cooled, which is provided by an air conditioning pack of the aircraft and which is for example provided to ventilate the cabin of the aircraft. The transfer of heat from the air conditioning process air to be cooled to the incoming air of the fuel cell to be heated may be made particularly energy-efficient if the heat exchanger is supplied with the air conditioning process air after the latter has been compressed by a cabin air compressor (CAC), since in this case the air conditioning process air is at a comparatively high temperature level. In particular, as a result of the relatively great temperature difference, in this arrangement the heat transfer surface and hence the size and weight of the transfer device may be kept relatively small. For this reason, the heat exchanger is preferably arranged downstream of a cabin air compressor in an air conditioning process air line of the aircraft air conditioning unit.

Coupling the aircraft fuel cell system according to the invention to the aircraft air conditioning unit minimises the energy expenditure for preparing the used air from the cabin which is to be supplied to the fuel cell. At the same time, less performance is required of an electrical air conditioning system of the aircraft air conditioning unit, since heat is taken from the air conditioning process air in the heat exchanger. This has the result that less performance is also required of the cabin air compressor or the primary and secondary heat transfer devices of the aircraft air conditioning unit, such as the need for ram air for the air conditioning process. A lower requirement for ram air has the direct effect of an advantageous reduction in the air drag of the aircraft.

Further, the aircraft fuel cell system according to the invention preferably includes a bypass line for bypassing the heat exchanger. Used air flowing to the used air outlet of the aircraft cabin can then optionally or partially be guided through the heat exchanger to increase the temperature or be fed past the heat exchanger. To control the flow through the heat exchanger or bypass line, a valve or a plurality of valves may be provided. With the aid of the valve(s), it is possible to control the temperature of the medium flowing through the oxidant supply line.

The oxidant supply line of the aircraft fuel cell system according to the invention may be connectable to a ram air duct of the aircraft by way of an ambient air line. Preferably, the ambient air line branches off from the oxidant supply line upstream of the compressor. A valve for controlling the supply of ambient air through the ambient air line may be arranged in the ambient air line. The fuel cell may be provided with sufficient air via the ambient air line even if the used air from the cabin which is supplied to the fuel cell via the used air outlet of the aircraft cabin is not sufficient to ensure proper operation of the fuel cell. The ambient air line consequently fulfils a redundancy and safety function which is particularly important if the aircraft fuel cell system according to the invention is provided for supplying electrical energy to safety-related devices on board the aircraft.

In many operating conditions of the aircraft fuel cell system according to the invention, the pressure of the fuel cell waste gas emerging from the fuel cell is above atmospheric pressure. It will be appreciated that the pressure of the fuel cell waste gas depends on the ambient conditions, the flying altitude of the aircraft and the charge condition of the fuel cell, but it may be up to three times atmospheric pressure. To enable the pressure energy stored in the fuel cell waste gas to be recovered, a waste gas outlet of the fuel cell is preferably connected to an expansion device. The expansion device may for example be in the form of a turbine and serve to expand the fuel cell waste gas, which is at a high pressure, to atmospheric pressure.

The expansion device which is for example in the form of a turbine may be coupled to a generator which converts the mechanical energy of the turbine into electrical energy. The electrical energy gained from the generator may for example be fed into an on-board supply system of the aircraft. As an alternative to this, however, the expansion device may also be coupled to one or more compressors. The compressor(s) may be arranged on a common shaft with the expansion device. The compressor(s) driven by the expansion device may be the compressor which is arranged in the oxidant supply line for compressing the used air from the cabin which is to be supplied to the fuel cell. As an alternative to this, however, the compressor(s) driven by the expansion device may also be associated with the aircraft air conditioning unit. Because some of the energy stored in the outlet air is contributed by the air conditioning unit in the form of compression work, it is to be expected that twice as much energy can be gained from expansion of the fuel cell waste gas as the compressor arranged in the oxidant supply line needs in operation to compress the used air from the cabin which is to be supplied to the fuel cell.

An aircraft fuel cell system according to the invention which is of redundant construction and hence operates particularly reliably includes a plurality of fuel cells and a plurality of compressors for compressing the used air from the cabin which is to be supplied to the fuel cells. The compressors may be arranged in respective branches of the oxidant supply line which connect the respective oxidant inlets of the fuel cells to the used air outlet of the aircraft cabin. Preferably, a compressor is associated with each fuel cell.

In principle, each compressor may be driven by an electric motor. As an alternative to this, however, it is also conceivable to arrange two or more compressors on a common shaft and to provide only one electric motor for driving these compressors. Finally, it is conceivable to drive a compressor or a plurality of compressors arranged on a common shaft using the air cycle machine of an air conditioning pack of the aircraft air conditioning unit.

In the case of a method according to the invention for operating an aircraft fuel cell system, a fuel cell having an oxidant inlet for supplying an oxygen-containing medium to the fuel cell is provided, with the oxidant inlet of the fuel cell being connected to a first end of an oxidant supply line. Used air from a used air outlet of a cabin of the aircraft is supplied to the oxidant inlet of the fuel cell via the oxidant supply line.

The medium flowing through the oxidant supply line may be compressed before it is supplied to the fuel cell.

Preferably, the medium flowing through the oxidant supply line is thermally coupled in a heat exchanger to a medium, for example air conditioning processing air, which flows through a line of an aircraft air conditioning unit.

The temperature of the medium flowing through the oxidant supply line may be controlled with the aid of a bypass line for bypassing the heat exchanger and a valve for controlling the flow of used air from the cabin through the heat exchanger or the bypass line.

When insufficient used air from the cabin is available, to ensure proper operation of the fuel cell the oxidant supply line may be supplied with ram air from a ram air duct of the aircraft via an ambient air line.

Fuel cell waste gas emerging from a waste gas outlet of the fuel cell is supplied to an expansion device. In the expansion device, the fuel cell waste gas, which is at a high pressure, is expanded to atmospheric pressure level. The energy recovered during this may be utilised to drive a generator or a mechanical consumer such as a compressor.

BREIF DESCRIPTION OF THE DRAWINGS

A preferred embodiment of an aircraft fuel cell system according to the invention is will now be described in more detail with reference to the attached schematic drawings, in which:

FIG. 1 shows an overview illustration of an aircraft fuel cell system,

FIGS. 2a to c show different variants on a compressor arrangement, and

FIGS. 3a to b show different variants on the utilisation of energy recovered by means of a turbine.

DETAILED DESCRIPTION

FIG. 1 shows a fuel system 10 which is provided for use on board an aeroplane and includes a plurality of fuel cells 12a, 12b, 12c, 12d. Each fuel cell 12a, 12b, 12c, 12d is in the form of a polymer electrolyte membrane fuel cell and has a cathode and an anode, separated from the cathode by a polymer electrolyte membrane. The cathode of each fuel cell 12a, 12b, 12c, 12d is connected to an oxidant inlet 14a, 14b, 14c, 14d, via which an oxygen-containing medium may be supplied to the cathode.

Each oxidant inlet 14a, 14b, 14c, 14d is connected to a first end of a corresponding branch 16a, 16b, 16c, 16d of an oxidant supply line 16. A second end of the oxidant supply line 16 is connected to a used air outlet 18 from a cabin 20 of the aircraft. When the aeroplane is in flight, the cabin 20 is kept at a pressure higher than atmospheric pressure with the aid of an air conditioning unit. When the aeroplane is at cruising altitude, the cabin pressure is approximately 0.8 bar. Thus, used air from the cabin which is at a markedly higher level of pressure than the ambient air when the aeroplane is in flight, in particular when the aeroplane is at cruising altitude, may be supplied to the oxidant inlet 14a, 14b, 14c, 14d of each fuel cell 12a, 12b, 12c, 12d via the oxidant supply line 16.

A respective compressor 22a, 22b, 22c, 22d is arranged in each of the branches 16a, 16b, 16c, 16d of the oxidant supply line 16. The compressors 22a, 22b, 22c, 22d serve to compress to the required pressure level of approximately 1.3 to 1.4 bar the used air from the cabin which is to be supplied to the fuel cells 12a, 12b, 12c, 12d. Moreover, the temperature of the used air from the cabin which is to be supplied to the fuel cells 12a, 12b, 12c, 12d is increased by the compression process. For reasons of redundancy, a separately constructed compressor 22a, 22b, 22c, 22d is associated with each fuel cell 12a, 12b, 12c, 12d.

As shown in FIGS. 1 and 2b, in each case two compressors 22a, 22b and 22c, 22d may be arranged on a common shaft and driven by an electric motor 24a, 24b. The electric motors are supplied with electrical energy by a respective converter 26a, 26b. Alternative compressor arrangements are shown in FIGS. 2a and 2c. According to FIG. 2a, two compressors 22a', 22b' arranged on a common shaft may also be driven by an air cycle machine 28 of an air conditioning pack of the aeroplane air conditioning unit. Finally, as shown in FIG. 2c, it is also possible to drive each compressor 22a", 22b" with the aid of a separate electric motor 24a", 24b".

As mentioned above, the used air from the cabin which is to be supplied to the fuel cells 12a, 12b, 12c, 12d is also heated by the compression process. To ensure proper pre-heating of the used air from the cabin which is to be supplied to the fuel cells 12a, 12b, 12c, 12d even at high operating temperatures of the fuel cells 12a, 12b, 12c, 12d, two heat exchangers 30a, 30b are further arranged in the oxidant supply line 16. To enable energy-efficient operation of the heat exchangers 30a, 30b, the heat exchangers 30a, 30b are positioned upstream of the compressors 22a, 22b, 22c, 22d in the oxidant supply line 16. In particular, as a result of the relatively great temperature difference, with an arrangement of this kind the heat transfer surface and hence the size and weight of the heat exchangers 30a, 30b may be kept relatively small.

The heat exchangers 30a, 30b create a thermal coupling of the used air from the cabin which flows through the oxidant supply line 16 and the air conditioning process air which is to be cooled and which flows through a line 32a, 32b of the aeroplane air conditioning unit. Heat from the air conditioning process air is transferred to the used air from the cabin in the heat exchangers 30a, 30b, with the result that the air conditioning process air is cooled to a lower temperature, while the used air from the cabin undergoes heating. The line 32a supplies to the heat exchanger 30a air conditioning process air which has been compressed by a cabin air compressor 31a of a first air conditioning pack of the aeroplane air conditioning unit and is thus at a high temperature. Similarly, the line 32b supplies to the heat exchanger 30b air conditioning process air to be cooled that has been compressed by a cabin air compressor 31b of a second air conditioning pack of the aeroplane air conditioning unit.

To ensure proper functioning of the fuel cells 12a, 12b, 12c, 12d even when insufficient used air from the cabin is available, the oxidant supply line 16 is connected to a ram air duct of the aircraft via two ambient air lines 34a, 34b. If necessary, the fuel cells 12a, 12b, 12c, 12d may thus be supplied with ram air that is at a higher pressure than atmospheric pressure by way of the ambient air lines 34a, 34b.

In many operating conditions, the fuel cells 12a, 12b, 12c, 12d give off fuel cell waste gas which is at a higher pressure level than atmospheric pressure, via corresponding waste gas outlets 36a, 36b, 36c, 36d. Depending on the ambient conditions, the flying altitude of the aeroplane and the charge condition of the fuel cells 12a, 12b, 12c, 12d, the pressure of the fuel cell waste gas may be up to three times atmospheric pressure. To recover the pressure energy stored in the fuel cell waste gas, the waste gas outlets 36a, 36b, 36c, 36d of the fuel cells 12a, 12b, 12c, 12d are therefore connected to an expansion device 38 which is in the form of a turbine. The fuel cell waste gas is expanded to atmospheric pressure level in the expansion device 38.

According to FIGS. 1 and 3a, the mechanical energy gained in the expansion device 38 is converted to electrical energy by a generator 40 coupled to the expansion device 38. The electrical energy generated by the generator 40 is fed to an on-board electrical supply system of the aeroplane and may for example supply the electric motors 24*a*, 24*b* with electrical energy for driving the compressors 22*a*, 22*b*, 22*c*, 22*d*. As shown in FIG. 3*b*, however, it is also possible to couple the expansion device 38 directly to a compressor 22*a*''' by way of a common shaft. The compressor 22*a*''' may for example be a compressor for compressing the used air from the cabin which is to be supplied to the fuel cells 12*a*, 12*b*, 12*c*, 12*d*. As an alternative to this, however, the compressor 22*a*''' may also be associated with the aeroplane air conditioning unit.

The invention claimed is:

1. An aircraft having a fuel cell system and an air conditioning unit, with the fuel cell system comprising:
   a fuel cell which has an oxidant inlet for supplying an oxygen-containing medium to the fuel cell,
   an oxidant supply line including a first end that is connected to the oxidant inlet of the fuel cell and including a second end that is connected to a used air outlet of a cabin of the aircraft, and
   a heat exchanger which is arranged in the oxidant supply line, wherein the heat exchanger thermally couples and transfers heat energy between the oxygen-containing medium flowing through the oxidant supply line of the fuel cell system and a second medium flowing through an air conditioning process air line of the air conditioning unit the heat exchanger being located downstream, in the direction of flow of the second medium, of a cabin air compressor arranged in the air conditioning process air line such that the second medium is compressed by the cabin air compressor and thereafter flows to the heat exchanger for transfer of heat energy with the oxygen-containing medium.

2. An aircraft according to claim 1, further comprising: a compressor arranged in the oxidant supply line.

3. An aircraft according to claim 2, wherein the compressor arranged in the oxidant supply line is located downstream, in the direction of flow of the oxygen-containing medium, of the heat exchanger such that a temperature difference between the oxygen-containing medium and the second medium at the heat exchanger is maximized.

4. An aircraft according to claim 1, further comprising:
   a bypass line for bypassing the heat exchanger, and
   a valve for controlling a temperature of the oxygen-containing medium flowing through the oxidant supply line by controlling flow through the bypass line.

5. An aircraft according to claim 1, wherein the oxidant supply line is connectable to a ram air duct of the aircraft via an ambient air line.

6. An aircraft according to claim 1, wherein a waste gas outlet of the fuel cell is connected to an expansion device.

7. An aircraft according to claim 1, further comprising:
   a plurality of fuel cells and a plurality of compressors, with a compressor being associated with each fuel cell.

8. A method for operating an aircraft having a fuel cell system and an air conditioning unit, the method comprising:
   operating a fuel cell having an oxidant inlet for supplying an oxygen-containing medium to the fuel cell, with the oxidant inlet of the fuel cell being connected to a first end of an oxidant supply line,
   supplying used air from a used air outlet of a cabin of the aircraft to the oxidant inlet of the fuel cell via the oxidant supply line, the used air outlet of the cabin being connected to a second end of the oxidant supply line, and
   using a heat exchanger arranged in the oxidant supply line to thermally couple and transfer heat energy between the oxygen-containing medium flowing through the oxidant supply line and a second medium which flows through an air conditioning process air line of the air conditioning unit, the heat exchanger being located downstream, in the direction of flow of the second medium, of a cabin air compressor arranged in the air conditioning process air line such that the second medium is compressed by the cabin air compressor and thereafter flows to the heat exchanger for transfer of heat energy with the oxygen-containing medium.

9. A method according to claim 8, further comprising:
   controlling a temperature of the oxygen-containing medium flowing through the oxidant supply line with a bypass line for bypassing the heat exchanger and a valve controlling flow through the bypass line.

10. A method according to claim 8, further comprising:
    supplying ram air from a ram air duct of the aircraft to the oxidant supply line via an ambient air line.

11. A method according to claim 8, further comprising:
    supplying fuel cell waste gas emerging from a waste gas outlet of the fuel cell to an expansion device, and
    expanding the fuel cell waste gas to atmospheric pressure level with the expansion device.

12. A method according to claim 8, further comprising:
    compressing the oxygen-containing medium with a compressor arranged in the oxidant supply line, the compressor being located downstream, in the direction of flow of the oxygen-containing medium, of the heat exchanger such that a temperature difference between the oxygen-containing medium and the second medium at the heat exchanger is maximized.

* * * * *